(12) United States Patent
Park et al.

(10) Patent No.: US 10,047,821 B2
(45) Date of Patent: Aug. 14, 2018

(54) ACTIVE ENGINE MOUNT HAVING VENT HOLE

(71) Applicant: PYUNG HWA INDUSTRIALS CO., LTD, Daegu (KR)

(72) Inventors: Changhyoun Park, Daegu (KR); Sangheun Oh, Daegu (KR); Byeongsang Son, Daegu (KR)

(73) Assignee: PYUNG HWA INDUSTRIALS CO., LTD, Daegu (KR)

( * ) Notice: Subject to any disclaimer, the term of this patent is extended or adjusted under 35 U.S.C. 154(b) by 0 days.

(21) Appl. No.: 15/479,863

(22) Filed: Apr. 5, 2017

(65) Prior Publication Data

US 2017/0292582 A1 Oct. 12, 2017
US 2018/0195575 A9 Jul. 12, 2018

(30) Foreign Application Priority Data

Apr. 8, 2016 (KR) .......... 10-2016-0043714

(51) Int. Cl.
*F16F 15/027* (2006.01)
*B60K 5/12* (2006.01)
*F16F 13/10* (2006.01)
*F16F 13/26* (2006.01)

(52) U.S. Cl.
CPC ........ F16F 15/0275 (2013.01); B60K 5/1283 (2013.01); B60K 5/1208 (2013.01); F16F 13/10 (2013.01); F16F 13/26 (2013.01); F16F 2222/12 (2013.01); F16F 2230/06 (2013.01)

(58) Field of Classification Search
CPC ........ F16F 15/0275; F16F 13/12; F16F 13/26; F16F 2222/12; F16F 2230/06; B60K 5/1283; B60K 5/1208
See application file for complete search history.

(56) References Cited

U.S. PATENT DOCUMENTS

| | | | | |
|---|---|---|---|---|
| 4,899,996 A * | 2/1990 | Maassen | ................ | F16F 13/26 267/140.14 |
| 5,642,873 A * | 7/1997 | Kato | ................ | F16F 13/26 267/140.14 |
| 5,792,948 A * | 8/1998 | Aoki | ................ | F16F 15/027 700/280 |
| 6,267,362 B1 * | 7/2001 | Satori | ................ | F16F 13/103 267/140.13 |
| 6,422,546 B1 * | 7/2002 | Nemoto | ................ | F16F 13/26 267/140.13 |
| 7,159,856 B2 * | 1/2007 | Satori | ................ | F16F 13/105 267/140.13 |
| 2005/0017420 A1 * | 1/2005 | Nemoto | ................ | B60K 5/1208 267/140.14 |
| 2007/0013116 A1 * | 1/2007 | Nemoto | ................ | B60K 5/1208 267/140.14 |

FOREIGN PATENT DOCUMENTS

JP 2004232708 A * 8/2004 ............ F16F 13/26
KR 2019990016017 U 5/1999

* cited by examiner

*Primary Examiner* — Xuan Lan T Nguyen
(74) *Attorney, Agent, or Firm* — Lucas & Mercanti, LLP (57) ABSTRACT

Provided is an active engine mount having a vent hole that includes a damper assembly including an exciter. The damper assembly in the active engine mount which controls pressure of a main chamber as the exciter is excited has a vent hole that enables communication from a lower part of the exciter to the outside formed thereon such that air inside the damper assembly can be discharged to the outside.

6 Claims, 6 Drawing Sheets

ACTIVE ENGINE MOUNT HAVING VENT HOLE

CROSS-REFERENCE TO RELATED APPLICATION

This application claims priority to and the benefit of Korean Patent Application No. 10-2016-0043714, filed on Apr. 8, 2016, the content of which is incorporated herein by reference in its entirety.

BACKGROUND

Field of the Invention

The present invention relates to an active engine mount, and more particularly, to an active engine mount for improving driving efficiency by forming a vent hole on a damper assembly to discharge air inside the damper assembly to the outside.

Discussion of Related Art

In general, an engine mount of a vehicle performs a function of supporting an engine and simultaneously serves to reduce vibration within a short time in order to prevent a phenomenon in which vibrations delivered from the engine to a passenger impair riding comfort.

In particular, recently, the development of an active engine mount which vibrates an exciter through an electrical control so that vibrations delivered from an engine mount can be more actively controlled depending on driving conditions of a vehicle or a working status of an engine has been active.

Such an active engine mount is configured to receive power according to an algorithm which is predetermined on the basis of an acceleration signal and information about conditions of a vehicle engine and a driving status to vary characteristics of the engine mount according to the driving conditions or the working status of the engine, and therefore it is advantageous in that the riding comfort and driving performance of the vehicle can be further improved.

However, a conventional active engine mount has a problem in that a coil generates heat of high temperatures due to various causes such as heat generation caused by excitation of an exciter, exhaust heat of an engine, and radiant heat of a road. This remarkably decreases durability of an elastic member, and also causes another problem of decreasing driving efficiency caused by air expansion because, in particular, an interior space of the engine mount is sealed.

Therefore, a method addressing such problems is required.

(Patent Document) Korean Laid Open Utility Model No. 20-1999-0016017

SUMMARY OF THE INVENTION

Accordingly, example embodiments of the present invention are directed to reduction of a decrease in durability and performance caused by internal heat generation and air expansion in an active engine mount.

The scope of the present invention is not limited to the above-described objects, and other unmentioned objects may be clearly understood by those skilled in the art from the following descriptions.

The present invention is directed to an active engine mount having a vent hole, wherein the active engine mount includes a damper assembly having an exciter. The damper assembly in the active engine mount which controls pressure of a main chamber as the exciter is excited has the vent hole formed thereon to enable communication from a lower part of the exciter to the outside so that air inside the damper assembly can be discharged to the outside.

The damper assembly may include a purification filter which is provided at the vent hole to filter a foreign substance introduced from the outside.

The damper assembly may include an upper orifice which is exposed on the main chamber, an exciting unit which is provided at a lower part of the upper orifice and includes the exciter, a driving unit which is provided at a lower part of the exciting unit and excites the exciter, a partition which is provided at a lower part of the driving unit to form a subchamber between the driving unit and the partition, and a lower orifice in which the exciting unit and the driving unit are accommodated and that enables communication between the main chamber and the subchamber, wherein the vent hole is formed to penetrate the exciting unit, the driving unit, and the partition.

The driving unit may include a magnet on which a first through-hole is formed, a lower housing on which the magnet is mounted and a second through-hole in communication with the first through-hole is formed, a coil which surrounds the magnet, a bobbin around which the coil is wound, and an inner housing which is provided between the bobbin and the magnet and on which a third through-hole in communication with the first through-hole is formed.

The first through-hole may include a purification filter for filtering a foreign substance introduced from the outside.

A vertical length of the purification filter may be formed to be smaller than a vertical length of the magnet such that steps are formed between the purification filter and the magnet, and the lower housing and the inner housing may include protrusions which are inserted into the steps.

A stopper in which a fourth through-hole in communication with the third through-hole is formed and that fixes the bobbin to the inner housing may be further included.

A recessed groove may be formed at a lower part of the lower housing, and the partition may include an inserting portion which is inserted into the recessed groove. A fixing member which fixes the partition to the lower housing by passing through the partition to be inserted into the second through-hole and on which a fifth through-hole in communication with the first through-hole is formed may be further included.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which.

DETAILED DESCRIPTION OF EXEMPLARY EMBODIMENTS

The preferred embodiments of the present invention will be described with reference to the accompanying drawings. In the course of description of the embodiments, the same elements will be given the same names and reference numerals, and additional descriptions thereof will be omitted.

Figure 1:
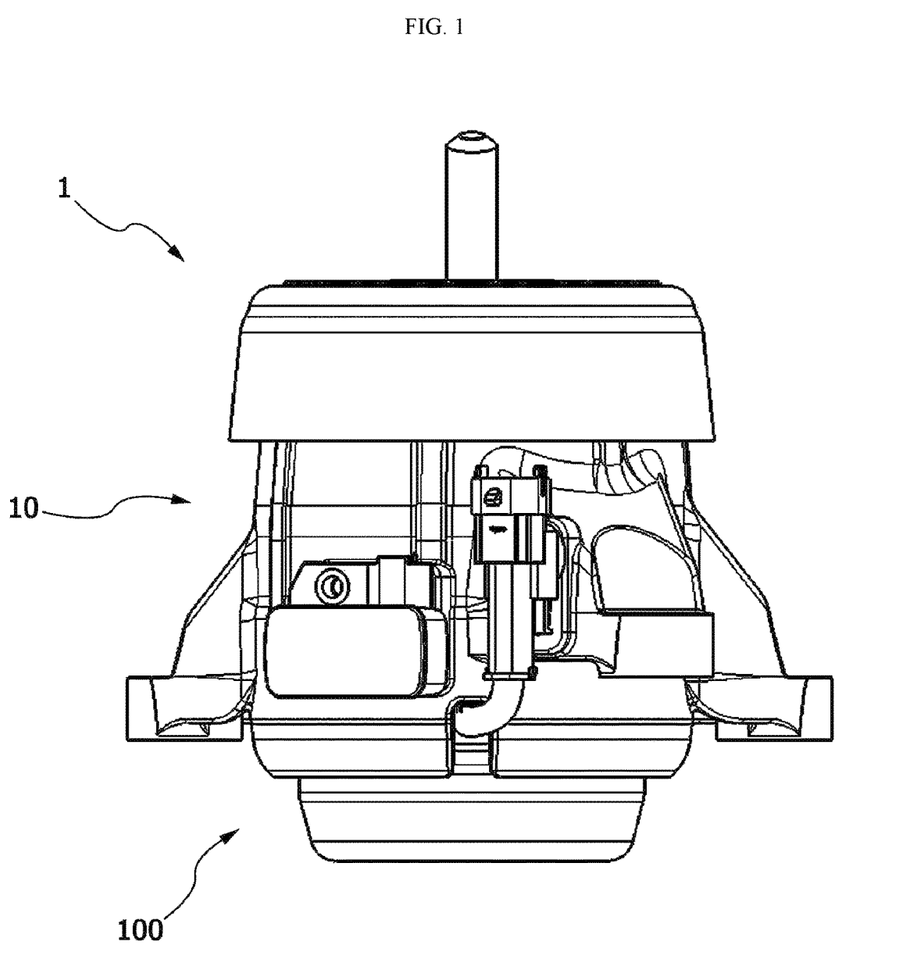
FIG. 1 is a view illustrating an exterior of an active engine mount according to one embodiment of the present invention.
Figure 2:
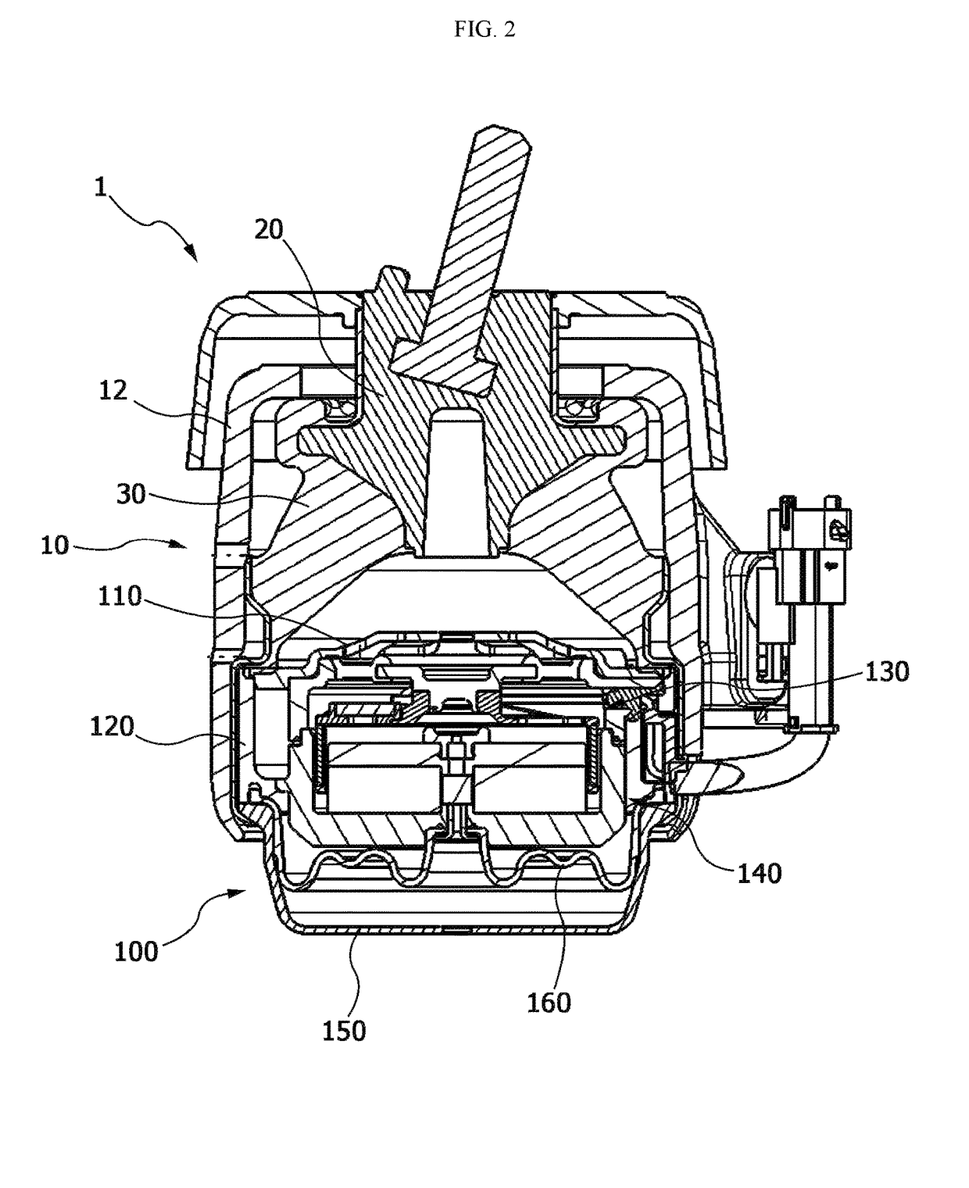
FIG. 2 is a view illustrating an inner structure of the active engine mount according to one embodiment of the present invention.

FIG. 1 is a view illustrating an exterior of an active engine mount 1 according to one embodiment of the present invention, and FIG. 2 is a view illustrating an inner structure of the active engine mount 1 according to one embodiment of the present invention.

The active engine mount 1 according to one embodiment of the present invention includes a damper assembly 100 and a body assembly 10 which encloses and is coupled to the damper assembly 100 as shown in FIG. 1.

Further, referring to FIG. 2, the body assembly 10 includes an upper case 12 which encloses the damper assembly 100, and a core 20 and an elastic member 30 which are provided inside the upper case 12.

The core 20 protrudes toward an upper part of the case 12 to support an engine of a vehicle, and is connected to the elastic member 30. The elastic member 30 is formed of an elastic material so that vibrations delivered from the engine are reduced, and in this case, the elastic member is formed of a rubber with insulating properties.

Further, the damper assembly 100 includes an upper orifice 110, a lower orifice 120, an exciting unit 130, a driving unit 140, and a partition 160.

Figure 3:
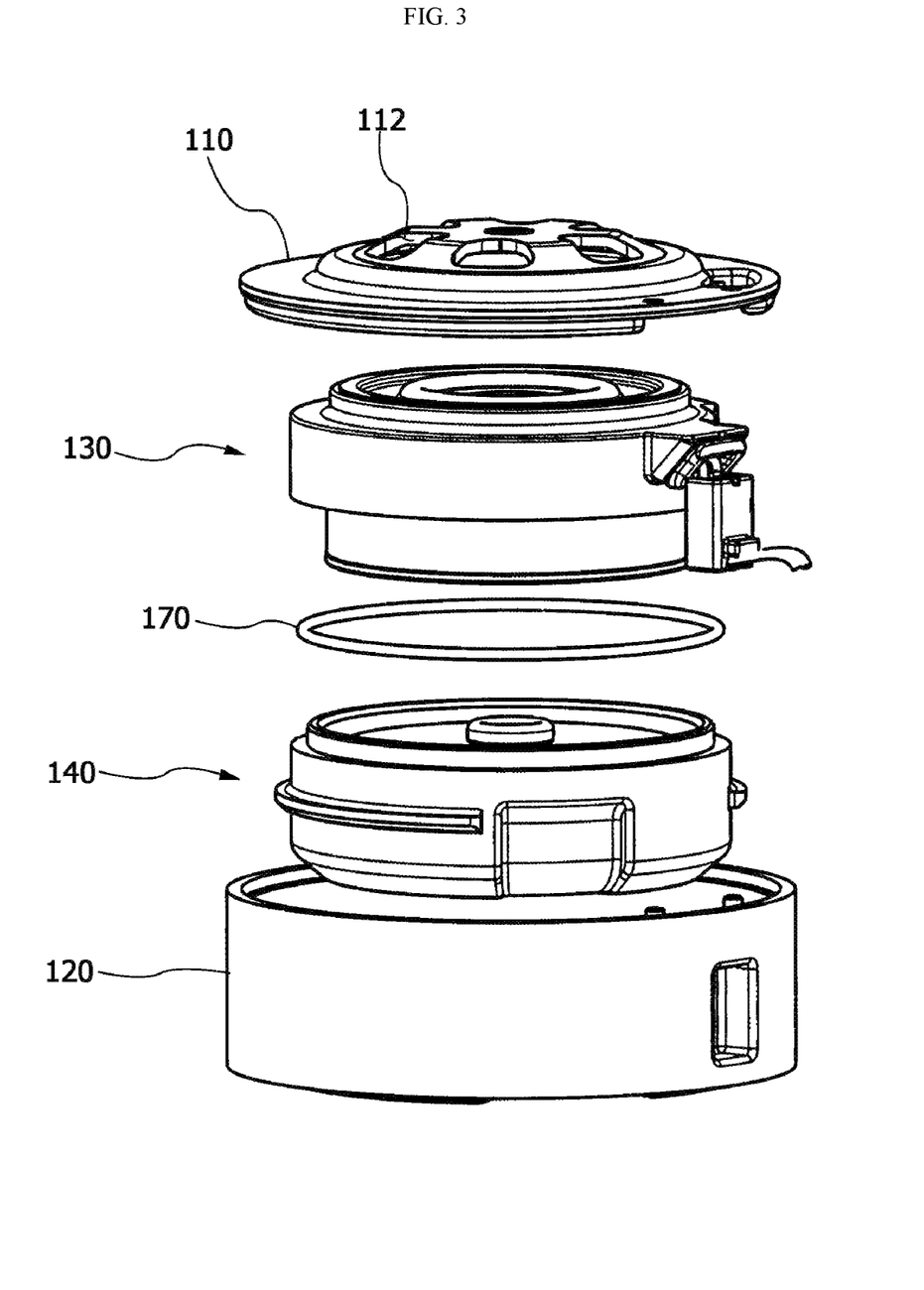
FIG. 3 is a view illustrating components of a damper assembly in the active engine mount according to one embodiment of the present invention.

As shown in FIGS. 2 and 3, the upper orifice 110 is provided on an upper part of the damper assembly 100 to form a main chamber between the core 20 and the elastic member 30, and a flow hole 112 is formed on the upper orifice such that a fluid accommodated in the main chamber can flow.

The exciting unit 130 is provided at a lower part of the upper orifice 110 and an exciter is accommodated therein. Further, the driving unit 140 is provided at a lower part of the exciting unit 130 to provide a driving force for exciting the exciter.

Further, the partition 160 is provided at a lower part of the driving unit 140, and has a subchamber formed between the driving unit 140 and the partition. Here, the lower orifice 120 provides a flow passage for communication between the main chamber and the subchamber, and therefore a fluid flows between the main chamber and the subchamber while absorbing vibrations from the engine.

Further, in the embodiment, the exciting unit 130 and the driving unit 140 are accommodated in the lower orifice 120, and the fluid may flow through an edge of the lower orifice 120. During the procedure, a sealing member 170 may be provided between the exciting unit 130 and the driving unit 140 in order to prevent the fluid from entering the exciting unit 130 and the driving unit 140.

Further, in the embodiment, a lower case 150 is coupled to a lower part of the partition 160. The lower case 150 supports the lower orifice 120 and the partition 160, and provides a gap so that the partition 160 may move to a certain degree.

Figure 4:
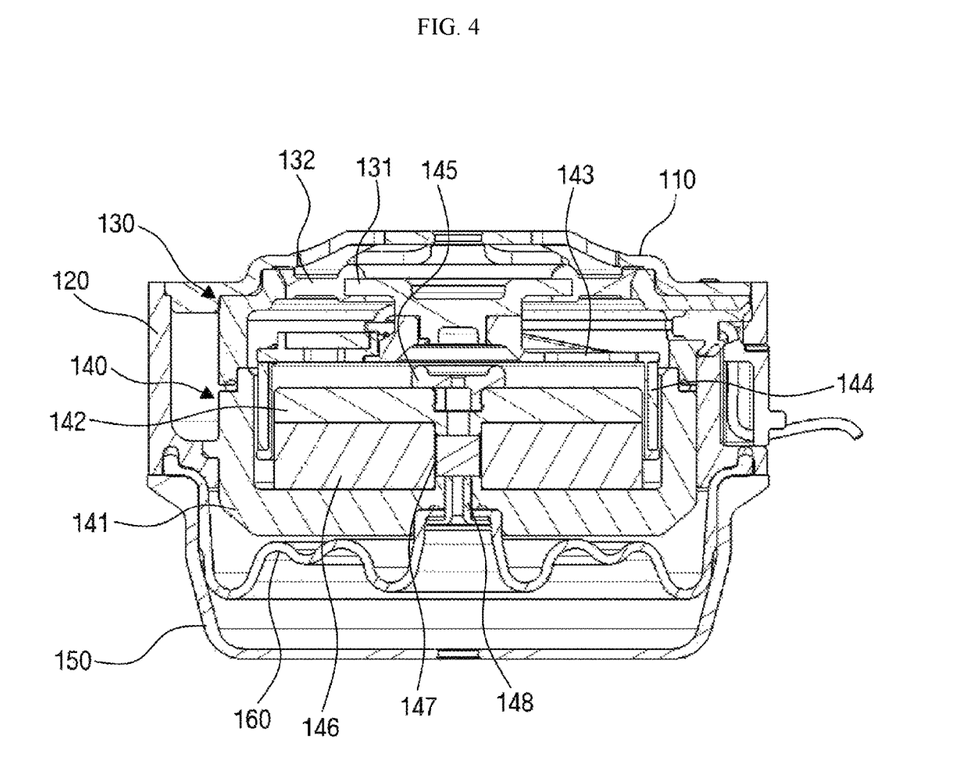
FIG. 4 is a view illustrating an inner structure of the damper assembly in the active engine mount according to one embodiment of the present invention in detail.

FIG. 4 is a view illustrating an inner structure of the damper assembly 100 in the active engine mount according to one embodiment of the present invention in detail, and structures of each component will be described in more detail with reference thereto.

In the embodiment, the exciting unit 130 includes an exciter 131 and a membrane 132. The exciter 131 may be excited vertically by the driving unit 140. Although the membrane 132 fixes the exciter 131, movement of the exciter 131 is not restricted because the membrane is formed of an elastic material.

Further, the driving unit 140 includes a lower housing 141 and an inner housing 142, and a magnet 146 is provided between the lower housing 141 and the inner housing 142.

Further, a coil 144 wound around a bobbin 143 is provided on an outer side of the magnet 146 so that the exciter 131 may be excited by a magnetic field when current is applied to the coil 144.

As described in the related art, in the case of a conventional active engine mount, there was a problem in that the coil 144 generates heat of high temperatures due to various causes such as heat generation caused by excitation of an exciter 131, exhaust heat of an engine, and radiant heat of a road. This remarkably weakens durability of an elastic member and decreases driving efficiency caused by air expansion.

To address such problems, in the present invention, a vent hole H is formed on the damper assembly 100. The vent hole H is an air flow passage which enables communication from a lower part of the exciter 131 to the outside so that air inside the damper assembly 100 can be discharged to the outside.

In the embodiment, the vent hole H is formed to pass through the exciting unit 130, the driving unit 140, the partition 160, and the lower case 150. That is, the vent hole H is in a shape that entirely enables communication from a direct lower part of the exciter 131 to the lower case 150 in order to prevent air expansion inside a sealed space by excitement of the exciter 131.

Accordingly, in the present invention, when the exciter 131 is excited, the air inside the damper assembly 100 is discharged to the outside through the vent hole H while outside air is introduced into the inside, and therefore air is circulated constantly. Thus, internal heat generation and air expansion caused by the internal heat generation may be minimized.

Further, the vent hole H may be formed in various shapes inside the damper assembly 100, however, the vent hole is formed in the shape of a straight line penetrating each component in the embodiment.

Hereinafter, detailed shapes of each component forming the vent hole H will be described in more detail.

Figure 5:
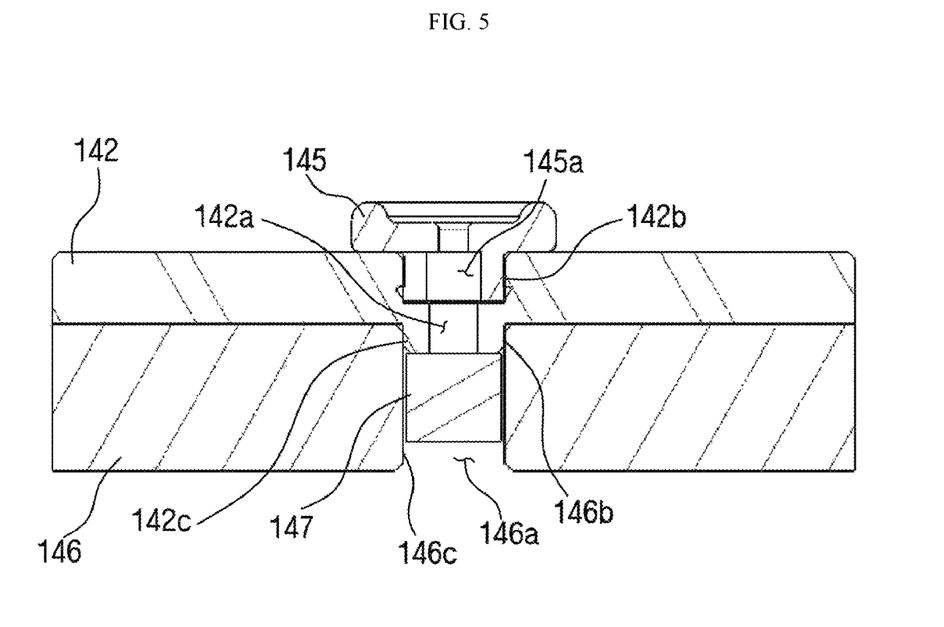
FIGS. 5 and 6 are views illustrating a structure of a vent hole in the active engine mount according to one embodiment of the present invention in detail.
Figure 6:
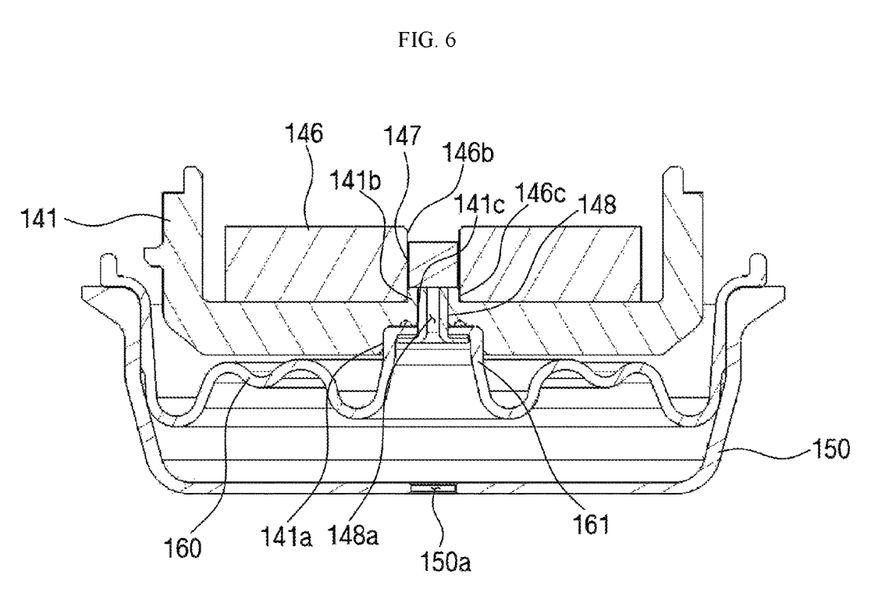

FIGS. 5 and 6 are views illustrating a structure of a vent hole H in the active engine mount according to one embodiment of the present invention in detail.

As shown in FIGS. 5 and 6, in the embodiment, the magnet 146 includes a first through-hole 146a in the center thereof, the lower housing 141 includes a second through-hole 141c which passes through a lower side of the first through-hole, and the inner housing 142 includes a third through-hole 142a which passes through an upper side of the first through-hole.

Here, a purification filter 147 is provided in the first through-hole, and the purification filter 147 serves to filter a foreign substance introduced from the outside to prevent the foreign substance from moving to a side of the exciter 131. However, unlike the embodiment, the purification filter 147 can be provided at any location of the vent hole H.

In particular, in the embodiment, a vertical length of the purification filter 147 is formed to be smaller than a vertical length of the magnet 146 so that steps 146b and 146c are formed between the purification filter 147 and the magnet 146. Further, the lower housing 141 and the inner housing 142 include protrusions 141b and 142c which are inserted into the steps 146b and 146c, respectively.

That is, the lower housing 141 and the inner housing 142 are in shapes in which the protrusions 141b and 142c are inserted into a part of the first through-hole 146a, which strengthens couplings between components and also prevents air flowing through the vent hole H from being introduced between interfaces of the components.

Meanwhile, in the embodiment, recessed grooves 142b and 141a are formed on the inner housing 142 and the lower housing 141, respectively. The recessed groove 142b of the inner housing 142 is provided to insert a stopper 145 for fixing the bobbin 143 to the inner housing 142, and the recessed groove 141a of the lower housing 141 is provided to insert the partition 160. For this, an inserting portion which is inserted into the recessed groove 141a is formed on the partition 160.

This not only strengthens couplings between components but also prevents air flowing through the vent hole H from being introduced between interfaces of the components. In addition, in the embodiment, a fixing member 148 which passes through the partition 160 to be inserted into the second through-hole of the lower housing 141 is further included to fix the partition 160.

Further, a fourth through-hole 145a in communication with the third through-hole 142a of the inner housing 142 is formed on the stopper 145, and a fifth through-hole 148a in communication with the first through-hole 146a of the magnet 146 is formed on the fixing member 148.

In addition, in the embodiment, because a sixth through-hole 150a is also formed on the lower case 150 which is provided at the bottom of the active engine mount, the present invention according to the above-described structures may discharge air from a low part of the exciter 131 to the outside of the lower case 150 or introduce outside air into the inside.

Therefore, the present invention may circulate the air constantly, which in turn minimizes internal heat generation and air expansion caused by the internal heat generation.

As described the above, the active engine mount having a vent hole according to the embodiments of the present invention can exhibit the following advantages.

First, when an exciter is excited, inside air is discharged to the outside through a vent hole while outside air is introduced into the inside so that air circulation constantly occurs. Therefore, it is advantageous in that internal heat generation and air expansion caused by the internal heat generation can be minimized.

Second, accordingly, it is advantageous in that reductions in durability of inner components such as an elastic member made of a rubber can be minimized, and performance of a product can be maximized.

Third, it is advantageous in that a vent hole can be easily manufactured, and therefore rise in unit cost can be minimized.

Effects of the present invention are not limited to the above-described effects and other unmentioned effects may be clearly understood by those skilled in the art from the scope of claims.

Although the preferred embodiments have been described, it will be apparent to those skilled in the art that various modifications and variations can be made in the present invention without departing from the spirit or scope of the inventions. Thus, the present invention is intended to cover the modifications and variations of this invention provided they come within the scope of the appended claims and their equivalents.

What is claimed is:

1. An active engine mount comprising:
a damper assembly having an exciter and controls pressure of a main chamber as the exciter is excited,
wherein a vent hole H that enables communication from a lower part of the exciter to the outside is formed in the damper assembly so that air inside the damper assembly is able to be discharged to the outside, and
wherein the damper assembly includes a purification filter which is provided at the vent hole H and filters a foreign substance introduced from the outside.

2. An active engine mount comprising,
a damper assembly having an exciter and controls pressure of a main chamber as the exciter is excited,
wherein a vent hole H that enables communication from a lower part of the exciter to the outside is formed in the damper assembly so that air inside the damper assembly is able to be discharged to the outside,
wherein the damper assembly includes:
an upper orifice exposed on the main chamber;
an exciting unit which is provided at a lower part of the upper orifice and includes the exciter;
a driving unit provided at a lower part of the exciting unit and configured to excite the exciter;
a partition provided at a lower part of the driving unit to form a subchamber between the driving unit and the partition; and
a lower orifice configured to accommodate the exciting unit and the driving unit therein and enable communication between the main chamber and the subchamber,
wherein the vent hole H is formed to penetrate the exciting unit, the driving unit, and the partition, and
wherein the driving unit includes:
a magnet on which a first through-hole is formed;
a lower housing on which the magnet is mounted and a second through-hole in communication with the first through-hole is formed;
a coil configured to surround the magnet;
a bobbin around which the coil is wound; and
an inner housing provided between the bobbin and the magnet and on which a third through-hole in communication with the first through-hole is formed.

3. The active engine mount of claim 2, wherein the first through-hole includes a purification filter for filtering a foreign substance introduced from the outside.

4. The active engine mount of claim 3,
wherein
a vertical length of the purification filter is formed to be smaller than a vertical length of the magnet such that steps are formed between the purification filter and the magnet, and
the lower and the inner housing include protrusions which are inserted into the steps.

5. The active engine mount of claim 2, further comprising a stopper on which a fourth through-hole in communication with the third through-hole is formed and configured to fix the bobbin to the inner housing.

6. The active engine mount of claim 2, further comprising:
a fixing member configured to fix the partition to the lower housing by passing through the partition to be inserted into the second through-hole and on which a fifth through-hole in communication with the first through-hole is formed,
wherein a recessed groove is formed on a lower part of the lower housing, and the partition includes an inserting portion which is inserted into the recessed groove.

* * * * *